United States Patent [19]
Cochran

[11] Patent Number: 4,724,404
[45] Date of Patent: Feb. 9, 1988

[54] AMPLITUDE-WEIGHTING ADAPTIVE LASER

[75] Inventor: Gregory M. Cochran, Fullerton, Calif.

[73] Assignee: Hughes Aircraft Company, Los Angeles, Calif.

[21] Appl. No.: 793,806

[22] Filed: Nov. 1, 1985

[51] Int. Cl.[4] ............................ G01B 11/26; G01J 1/20
[52] U.S. Cl. ...................................... 332/7.51; 372/33; 250/201; 350/607
[58] Field of Search .................. 250/201; 350/6.5, 607; 356/5; 372/29, 31, 33, 95; 332/7.51

[56] References Cited

U.S. PATENT DOCUMENTS

| | | | |
|---|---|---|---|
| 4,249,140 | 2/1981 | Frieberg | 372/33 |
| 4,326,800 | 4/1982 | Fitts | 356/363 |
| 4,393,303 | 7/1983 | Spinhirne | 372/95 |
| 4,405,232 | 9/1983 | Mansell | 250/201 |
| 4,471,445 | 9/1984 | Pernich | 350/162.12 |
| 4,490,039 | 12/1984 | Bruckler et al. | 250/201 |

OTHER PUBLICATIONS

D. Armitage, "Holographic Phase Conjugation and Strehl Ratio", Appl. Opt., vol. 21, #17, pp. 3197-3199, 9/01/82.

*Primary Examiner*—Nelson Moskowitz
*Attorney, Agent, or Firm*—Ronald L. Taylor; A. W. Karambelas

[57] ABSTRACT

An adaptive laser system (10) includes an adaptable laser (12), a waveform sensor (14), an amplitude distribution sensor (16), and a processor (18) for converting data from the sensors into commands for controlling the waveform of a laser beam. Amplitude distribution data is to weight waveform data as the processor determines actuator commands for deforming the laser's main mirror (22). Amplitude weighting permits more accurate determination of the waveform sensor-to-actuator-coupling matrix and more precise optimization of the on-axis intensity of the laser beam across the laser aperture.

11 Claims, 2 Drawing Figures

AMPLITUDE-WEIGHTING ADAPTIVE LASER

GOVERNMENT RIGHTS IN INVENTION

The Government of the United States of America has rights in this invention pursuant to a government contract.

BACKGROUND OF THE INVENTION

The present invention relates to adaptive lasers, and, more particularly, to a method and system for increasing the power deliverable by an adaptive laser subject to wavefront distortions.

Adaptive optical systems have been developed to deal with the loss of power deliverable by a laser due to wavefront aberrations. These aberrations can be introduced by the laser system, for example by imperfections in the optical train. Alternatively, nonuniformities in the laser beam media, for example, atmospheric anomalies, can distort the laser wavefront.

Generally, an adaptive laser includes a laser source with optics adaptable to control the outgoing waveform, a waveform sensor, and a processor for converting sensor data into commands directed to the adaptable optical element of the laser. Ideally, such a system would include a waveform sensor with infinite resolution, a completely deformable mirror, and a processor which validly converts the sensor data to mirror adjustments to produce the desired waveform. In practice, there are limitations to the adaptability of the laser source, to the accuracy, precision and validity of the sensor measurements, and, as a result of the foregoing, to the validity of the translation of sensor data into commands by the processor.

Typically, the adaptable element of the laser source is the primary mirror. A number of actuators can be applied to deform the mirror. The degree to which mirror deformation can be controlled is limited by the number of actuators. Thus, generally, even with ideal waveform determination and translation into actuator commands, the resulting waveform only approximates the desired uniform wavefront.

Of course, available sensors fall short of the infinite resolution waveform ideal in several respects. It turns out that the most practical sensors measure waveform indirectly and with quite limited resolution. Examples of such sensors include the Hartman sensor, the shearing interferometer and the integrated imaging irradiance sensor. The output of these sensors is typically treated as wavefront slope data, which is the derivative of the desired waveform or optical path difference (OPD) data.

There are several substantially equivalent ways for a processor to convert such sensor data into actuator commands. In one approach, the slope data is integrated to obtain a reconstructed wavefront. The resulting OPD data can then be processed according to a predetermined relationship between actuator commands and effects on OPD so as to minimize the root-mean-square of the expected OPDs.

Another approach bypasses the conversion to OPD data by using a direct relationship between actuator commands and effects on wavefront slope. This approach applies a least squares fit of wavefront slopes to a discrete wavefront map, thereby attempting to minimize the sum of squares of the wavefront slope measurements across the laser aperture. The applied algorithm has the form:

$$\hat{a} = (H^T H)^{-1} H^T s$$

where $\hat{a}$ is the actuator command vector estimate, H is the actuator-sensor coupling matrix, and s is the slope vector. The actuator command vector estimates the commands predicted to result in the desired wavefront figure of merit at the sensor. The actuator-sensor coupling matrix, also known as the actuator-sensor Jacobian, describes what slope value a given subaperture will measure when a given actuator is pushed.

In practice, adaptive lasers in accordance with the foregoing fall far short of theoretical performance. In some situations, not only is the ideal not approached, but the "corrected" laser delivers less power than would the same laser without the correction. Furthermore, successive corrections can fail to converge and introduce dynamic instability into the system.

It is anticipated that advances will permit greater numbers of actuators and improved sensors. However, the performance of future systems incorporating such refinements and present systems incorporating today's technology are not optimized by the current methods of translating waveform data into actuator commands. A need exists for a new adaptive optics system and corresponding method for the enhanced power delivery by lasers.

SUMMARY OF THE INVENTION

The present invention provides for amplitude weighting of waveform data in determining compensating adjustments for an adaptive laser. Accordingly, a system in accordance with the present invention includes an adaptable laser, a waveform sensor, an amplitude distribution sensor, and a processor. The processor uses amplitude distribution data to weight waveform data in calculating actuator command vectors.

A recognition upon which this invention is based is that the power delivered to a destination is characterized by a function of an integral of the amplitude-weighted square of optical path differences. Greater accuracy and stability can be achieved by obtaining and properly processing the amplitude data neglected by conventional adaptive optics.

The present invention provides for the incorporation of amplitude sensors of greater resolution than the resolution of the waveform sensors so that, in addition to the corrections made on the scale of the laser aperture, adjustments can be made on the scale of the subapertures defined by the limited resolution of the wavefront slope sensor. In the case of sensors that provide unweighted OPD or slope data, the amplitude distribution is used to properly emphasize the higher amplitude regions within a subaperture in correcting the waveform. This is analogous to the procedure applied across the whole laser aperture.

Many waveform sensors, such as the Hartman sensor, provide amplitude-affected data. Where such a sensor is employed, the amplitude distribution is necessary to determine the sensor-actuator coupling matrix so that the optimal actuator commands can be calculated.

The advantages of the present invention are explicated below in the detailed descriptions. Intuitively, it is understood that a finite number of actuators implies that compromises must be made. The prior art system biases its compromises in favor of subapertures with great distortion, despite very small amplitude, at the expense of subapertures with moderate distortion and very large amplitude. The present invention properly balances the amplitude and distortion factors. Thus, the present invention performs its adjustments where they do the most good, i.e., make the greatest contribution to the power delivered.

DETAILED DESCRIPTION OF THE PREFERRED EMBODIMENTS

Figure 1:
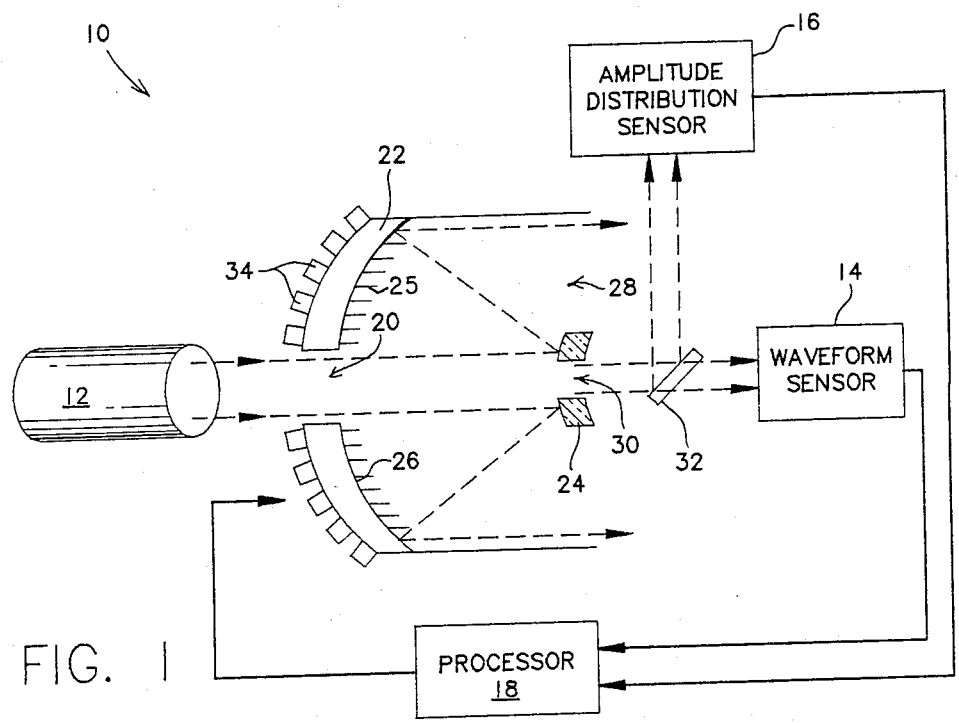
FIG. 1 is a schematic of a system in accordance with the present invention.

In accordance with the present invention, an adaptive laser system 10 includes an adaptable laser 12, a waveform sensor 14, an amplitude distribution sensor 16, and a processor 18 for converting data from the sensors into commands for controlling the waveform of a laser beam exiting the laser 12, as illustrated in FIG. 1. The method of the present invention provides for enhanced power delivery by amplitude weighting waveform data in controlling compensating deformations in the laser beam.

The laser 12 transmits coherent radiation through an aperture 20 in a main mirror 22. The radiation is then reflected by a secondary mirror 24 and again by a reflective surface 26 of the main mirror. The collimated reflection from the main mirror 22 exits toward the destination through an aperture 28 about the secondary mirror 24.

The main mirror 22 has a holographic coating 25 on its reflective surface 26 to direct a small fraction of the radiation through an aperture 30 at the center of the secondary mirror 24. This sample is used as the input to the sensors 14 and 16. As the sample exits the secondary mirror, it is split by a partially transmitting and partially reflecting mirror 32 so that beam samples are incident to both the amplitude sensor 16 and the waveform sensor 14. The illustrated waveform sensor 14 is a Hartman sensor which provides amplitude-affected slope data for each of the subapertures it defines.

So that amplitude weighting can be used on the scale of the subapertures, the resolution of the amplitude distribution sensor 16 should provide at least four times the resolution of the waveform sensor 14. Preferably, the amplitude sensor has a resolution at least about an order of magnitude greater than that of the waveform sensor.

The outputs of the sensors 14 and 16 are directed to the processor 18 which computes an estimated amplitude-weighted waveform and converts the estimate into actuator commands. In the illustrated laser system 10, the actuators 34 include piezoelectric elements disposed on the side of the deformable main mirror 22 opposite its reflective surface 26. Electrical commands applied to the piezoelectric elements cause them to expand or contract, thus controlling the shape of the deformable mirror 22.

The present invention provides an improvement over the conventional adaptive laser for substantially any combination of actuators and wavefront slope sensors. By way of example only, the illustrated embodiment includes forty-nine actuators 34 and a comparable number of subapertures defined by the Hartman sensor; the amplitude sensor 16 is a charge-coupled device capable of providing a resolution at least nine times finer than that of the Hartman sensor 14.

The method of the present invention can be conducted on the scale of the laser aperture and additionally on the scale of the subapertures defined by the Hartman sensor 14. On either scale, the invention provides for mathematically equivalent and substantially equivalent alternatives. The common objective of these procedures is to minimize $<\underline{o}W\underline{o}>$, where o is the optical path difference vector and W is a diagonal matrix with each diagonal element representing the amplitude measured at a corresponding sensor element. Applying standard weighted least squares, the actuator command vector that minimizes $<\underline{o}W\underline{o}>$ is $$a = (F^T W F)^{-1} F^T W o$$

where F is the predetermined unweighted OPD-to-actuator coupling matrix which satisfied $Fa=o$, and $F^T$ is the transpose of F.

The actuator command formula above can be applied to systems incorporating any type of waveform sensor which can provide, directly or indirectly, the unweighted optical path difference vector o. In the illustrated embodiment, the Hartman sensor renders an amplitude-affected slope vector $\underline{s}$. (Herein, underlining demarks amplitude-affected or amplitude-weighted variables.)

To obtain the vector o, the amplitude data can be used to convert $\underline{s}$ to its unweighted counterpart s, which can then be translated:

$$ti\ o = (G^T G)^{-1} G^T s$$

where G is the slope/OPD coupling matrix which satisfies the formula $Go=s$. Alternatively, the amplitude distribution can be applied to obtain $\underline{G}$, the slope/OPD coupling matrix which takes into account weighting effects. Then o is obtained according to the formula:

$$o = (\underline{G}^T \underline{G})^{-1} \underline{G}^t \underline{s}.$$

It is not necessary to explicitly calculate o; substitution yields:

$$\hat{a} = (F^T W F)^{-1} F^T W (\underline{G}^T \underline{G})^{-1} \underline{G}^T \underline{s}$$

This expression may be converted to a form like that used in conventional systems:

$$\hat{a} = (H^T W' H)^{-1} H^T W' \underline{s}$$

Here H is the amplitude calibrated sensor/actuator derivative matrix, e.g. $H = FG$; W' is the best weight matrix:

$$W' = \underline{G} (\underline{G}^T \underline{G})^{-1} W (\underline{G}^T \underline{G})^{-1} \underline{G}^T$$

Figure 2:
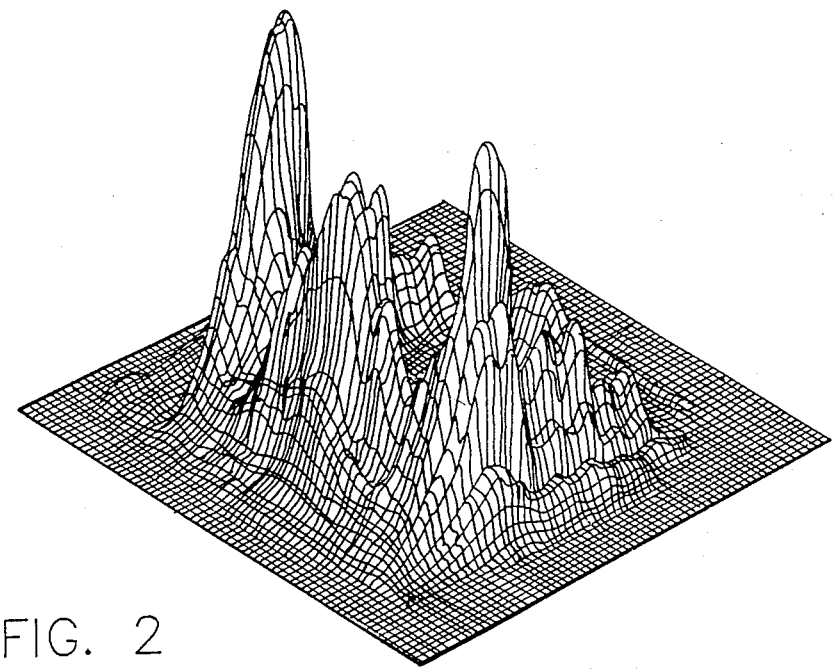
FIG. 2 is a graphic representation of the amplitude distribution of a laser.

Comparison of the conventional adaptive laser with the present invention yields clear results. In a simulation study using the illustrated laser's amplitude distribution, shown in FIG. 2, the illustrated system 10 yielded a Strehl ratio of 96%, while the unweighted convention system using a like number of actuators and a waveform sensor of like resolution yielded a Strehl ratio of 75%. Ideal sensing, with infinite resolution, gives a Strehl ratio of 97%.

The advantage of the present invention over the prior art can be comprehended conceptually by considering a beam in which there are no optical path differences, but in which the amplitude varies with a spatial frequency high compared to the scale of the subapertures of a Hartman sensor. Due to the amplitude effects, the Hartman sensor renders a nonconstant distribution in response to such a wavefront. A conventional system, ignoring amplitude effects, incorrectly determines that corrections are necessary and effects actuator movements which diminish power delivery. The present invention takes amplitude variations into account and does not require actuator movements in such a case. Also, on the scale of the aperture, the appropriate compromises between amplitude and optical path differences can be made, whereas in the conventional system, amplitude is ignored and path differences are given undue weight.

The method involving amplitude weighting across the aperture and across subapertures can be considered either as a double estimation or as creating a proper error metric and then performing a standard weighted estimation. The single and double estimations are applicable to waveform sensors in general. Thus, amplitude-affected slope sensors other than the Hartman sensor can be used; unweighted and other slope sensors, weighted and unweighted optical path difference sensors, are all provided for by the present invention. In fact, any means for directly or indirectly characterizing the waveform of a laser beam can be incorporated by the present invention.

The present invention provides for improvements over unweighted systems for any number of actuators and any resolutions of the sensors. Typically, the actuators number in the tens or into the hundreds, and the waveform sensors define a comparable number of subapertures. The amplitude sensors can have comparable resolution if the amplitude weighting is directed to the laser aperture. The resolution of the amplitude sensor is preferably about an order of magnitude or more above that of the waveform sensor to provide for double amplitude-weighted estimation.

Where the amplitude distribution is constant over time, but spatially nonuniform, the present invention can be used to calibrate the laser. This calibration can involve establishing an amplitude-weighted waveform sensor-to-actuator coupling matrix. This permits amplitude-affected sensor data to be converted directly to actuator commands without real-time monitoring by the amplitude sensor. Alternatively, the calibration could be supplemented by periodic checks for drifts in the sensor-actuator coupling matrix.

The invention provides for various sensor locations. In a laser communications system, the sensors can be located at the receivers and the results fed back for adjustments. Alternatively, an inverse beam generated by the destination station can be detected locally and used in making corrections as to aberrations induced by the intervening medium. Reflections can also be used in this way. Finally, as in the illustrated embodiment, the sensors can be deployed locally to calibrate the laser on a near-real-time or a one-shot basis.

Generally, the goal of adaptive optics is to maximize the power at a destination and this is accomplished by "flattening" the wavefront. However, the present invention is applicable generally to optimizing functions of laser beam amplitude distribution and waveform. For example, the present invention can be used to approximate any desired wavefront shape, and is not limited to minimizing optical path differences.

Thus, the present invention provides a general improvement in power delivery over prior systems. The improvements are greatest where amplitude varies considerably and where the number of actuators is not large. As indicated, the present invention is subject to modifications and variations, included those suggested above and others, so that the invention is limited only by the scope of the following claims.

What is claimed is:

1. A laser system comprising:
   a laser source for generating a laser beam with a waveform and amplitude distribution;
   actuator means for changing the waveform of said laser beam;
   waveform sensor means for determining the waveform of said laser beam;
   amplitude sensor means for determining the amplitude distribution of said laser beam; and
   processor means for converting determinations as to waveform and amplitude distribution into commands to said actuator means to optimize a predetermined figure of merit, said figure of merit being a function of waveform and amplitude distribution of the laser beam.

2. The system of claim 1 further characterized in that said figure of merit is the on-axis intensity of the laser beam.

3. The system of claim 1 further characterized in that said waveform sensor renders optical path difference data.

4. The system of claim 1 further characterized in that said waveform sensor renders amplitude-affected optical path difference data.

5. The system of claim 1 further characterized in that said waveform sensor renders wavefront slope data.

6. The system of claim 1 further characterized in that said waveform sensor provides amplitude-affected slope data.

7. The system of claim 1 further characterized in that the resolution of amplitude sensor means is at least about an order of magnitude greater than that of said wavefront sensor.

8. The system of claim 7 further characterized in that said processor means calculates the sensor-to-actuator coupling matrix using said waveform and amplitude distribution determinations.

9. A method of optimizing a figure of merit which is a function of the amplitude distribution and the waveform of a laser beam, said method comprising the steps of:
   generating a laser beam;
   determining the waveform of said laser beam;
   determining the amplitude distribution of said laser beam;
   estimating from the above determinations the changes in the laser beam required to optimize said figure of merit; and
   converting said estimate into commands that effect the estimated changes in waveform.

10. The method of claim 9 further characterized in that said figure of merit is the on-axis intensity of said laser beam.

11. The method of claim 9 further characterized in that said optimization comprises minimizing $<oWo>$, where o is the waveform determination in the form of an optical path difference vector, and W is said amplitude distribution data in the form of a diagonal matrix.

* * * * *